No. 792,446. PATENTED JUNE 13, 1905.
P. PATTERSON.
MANUFACTURE OF TUBING.
APPLICATION FILED OCT. 5, 1900. RENEWED APR. 21, 1902.
2 SHEETS—SHEET 1.
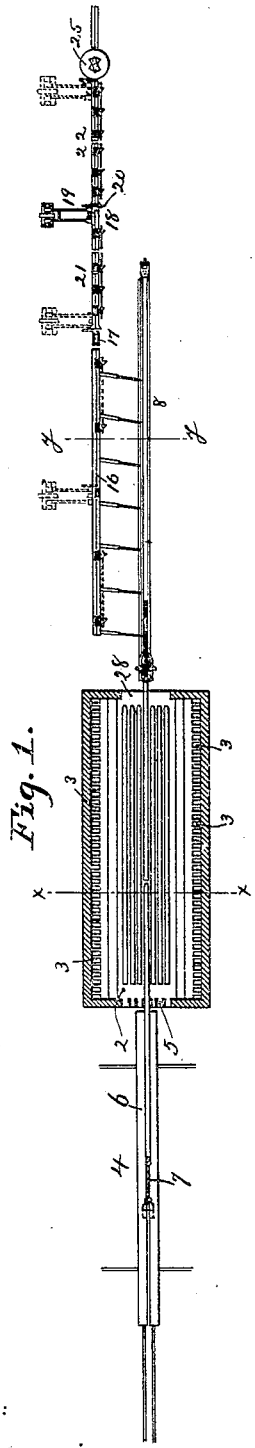
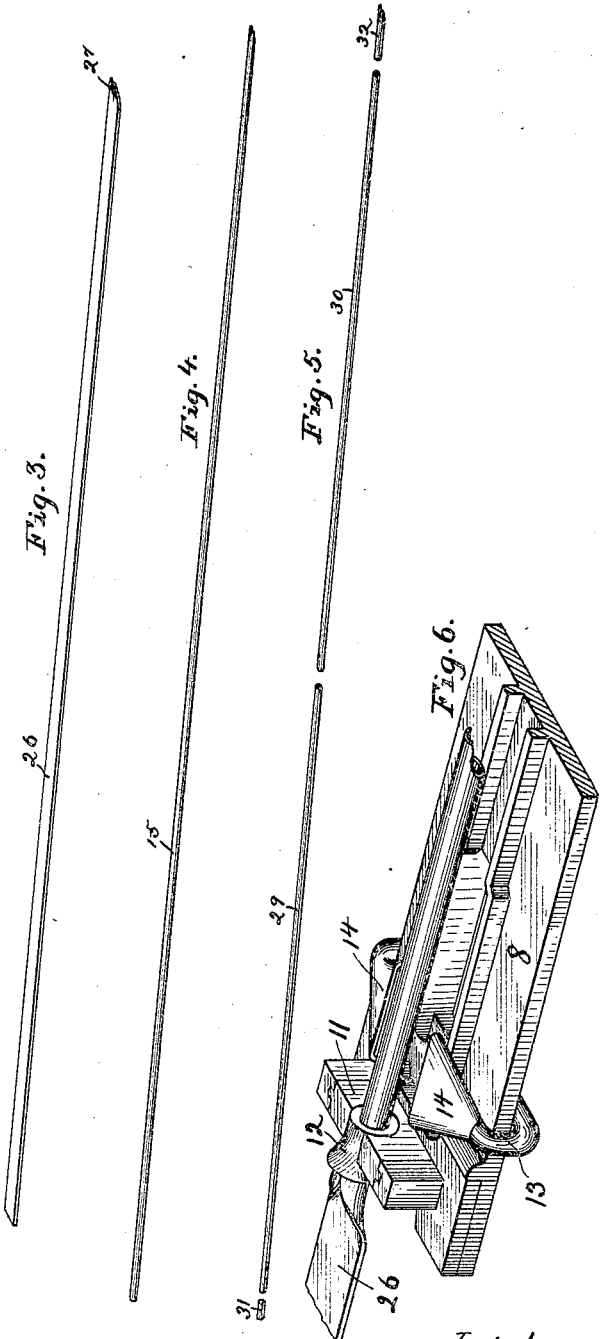
Witnesses:
Inventor:
Peter Patterson
By Kay & Totten
Attorneys.

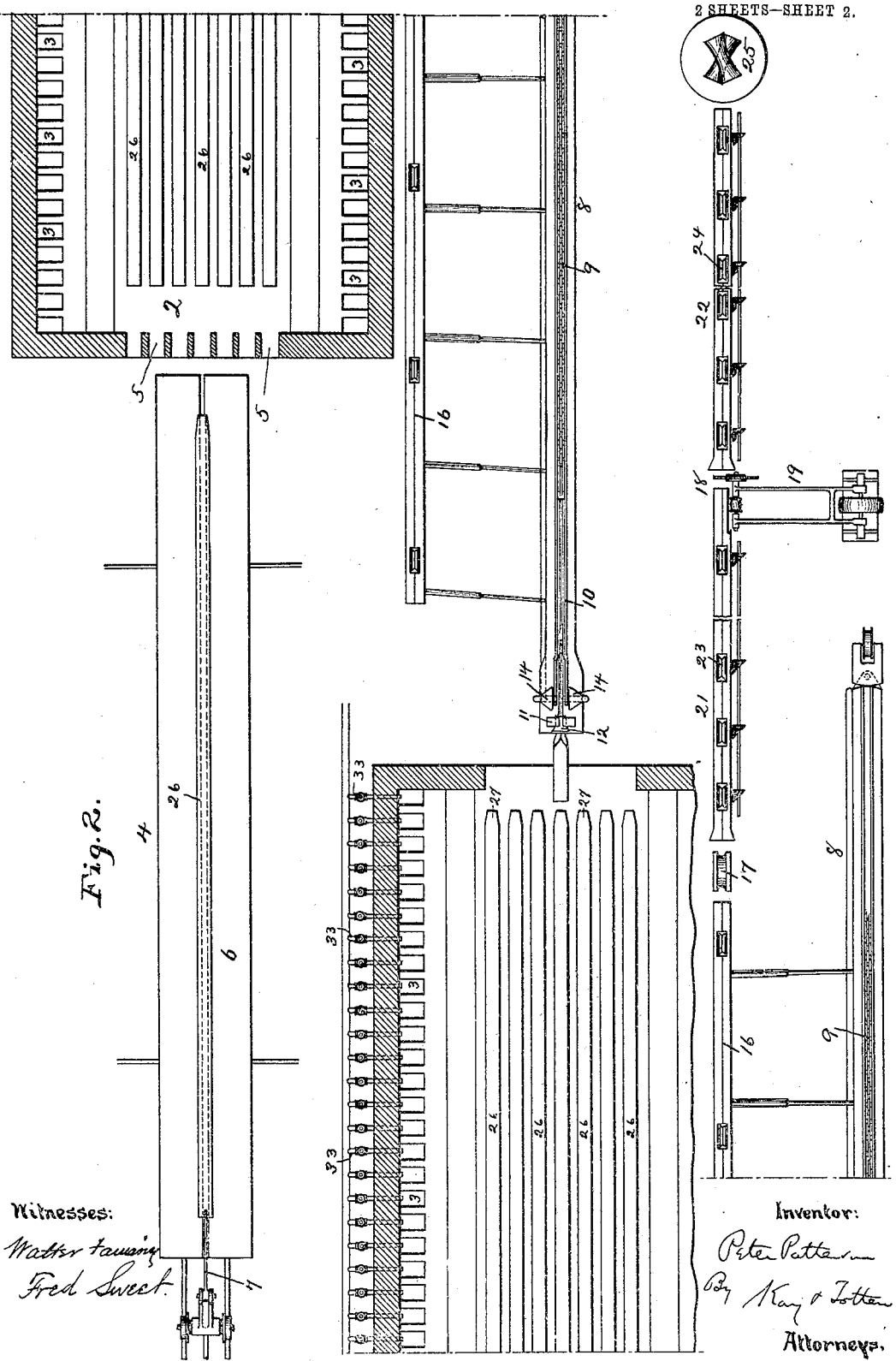

No. 792,446.                                                              Patented June 13, 1905.

UNITED STATES PATENT OFFICE.

PETER PATTERSON, OF McKEESPORT, PENNSYLVANIA, ASSIGNOR TO NATIONAL TUBE COMPANY, OF NEW YORK, N. Y., A CORPORATION OF NEW JERSEY.

MANUFACTURE OF TUBING.

SPECIFICATION forming part of Letters Patent No. 792,446, dated June 13, 1905.

Application filed October 5, 1900. Renewed April 21, 1902. Serial No. 103,915.

*To all whom it may concern:*

Be it known that I, PETER PATTERSON, a resident of McKeesport, in the county of Allegheny and State of Pennsylvania, have invented a new and useful Improvement in the Manufacture of Tubing; and I do hereby declare the following to be a full, clear, and exact description thereof.

My invention relates to the manufacture of tubing; and its object is to provide for the welding of more than a single standard length of tubing at one operation. My invention is designed for and is especially applicable to the manufacture of butt-weld tubing from flat strips or plates, and I will describe it in connection therewith; but it is to be understood that it is not limited thereto, but may be practiced with any suitable tube-blanks, such as U-shaped or like tubular blanks.

As the welding operations have heretofore been carried on the most approved practice has been to charge tube-blanks in the form of flat plates or strips of metal of a length sufficient to form a single welded tube of standard length through the rear end of the furnace into the furnace-chamber, permitting the strips to rest in the positions in which they were charged and when they were at the proper heat to grasp the end of each strip with tongs or like pipe-drawing tool and connect the same to a drawing apparatus, and thereby draw the strip when its edges were at a high welding heat through a welding-bell, as described in Letters Patent No. 581,251, granted to me April 20, 1897. The welded tube was then passed through what are termed "sizing-rolls" to bring it to substantially the same diameter throughout its length and then through finishing-rolls in which the blank was rotated as it was fed forward to smooth its surface and to bring it to true cylindrical form. The strips employed were somewhat shorter than the finished tube, being generally sixteen to eighteen (16 to 18) feet in length and forming finished tubes from eighteen to twenty (18 to 20) feet in length, and after the tubes were finished the end portions thereof were cut off, metal at each end of a standard tube being thus wasted and forming scrap.

The several manipulations above described are necessary with each length of standard tube produced, and as time is lost in each operation and part of the heat of the furnace wasted after the withdrawal of the heated strip and before the charging of the fresh strip it is evident that any means by which the number of manipulations per tube produced can be reduced will effect a corresponding saving in the cost of tubing.

The present invention is designed to secure increase of output, diminution of scrap, saving of labor, and the utilization of the heat conditions in such wise as to assure a practically perfect weld in the manufacture of tubes of standard length from multiple-length blanks.

To these ends my invention consists, generally stated, in certain improvements in welding and finishing tubing set forth in the claims, including, among others, feeding into a furnace-chamber a multiple-length tube-blank, (sufficiently long to form two or more tubes of standard length,) raising its edges to a welding heat, drawing it through a welding-bell, and thereby welding it into tubing, and avoiding severe torsional strain or whipping action during finishing by dividing it into lengths and while still at rolling-heat cross-rolling each length separately, also cooling the welded part of the tube as it issues from the welding-bell sufficiently to prevent its stretching, while the remainder of the strip is being welded by being drawn through the welding-bell, by the application of a cooling medium, such as an air-blast or water-jets, also so feeding and withdrawing the blank that the end first welded is at a slightly lower heat when passing through the welding-bell than the end last welded, so that the tube will not be so liable to stretch under the drawing strain. In this way a single tube long enough to make two or more standard tubes may be produced at the same welding operation, at one heat, and with about the same labor as is required to produce one standard tube, saving largely in the cost of fuel and increasing the product at least one-half, while reducing the amount of scrap produced to one-half, because the ends only of the double-length tube are lost as scrap.

To enable others skilled in the art to practice my invention, I will describe the same in connection with the production of double-length tubing—i. e., tubing sufficiently long to cut up into two tubes of standard length—from blanks in the form of flat strips or plates, as illustrated in the accompanying drawings, in which—

Figure 1 is a plan view of the required plant, except that the top of the furnace has been removed. Fig. 2 is an enlarged plan of the same divided into three parts on the lines $xx$ and $yy$ on Fig. 1. Fig. 3 is a view of the plate as charged. Fig. 4 is a view of the welded tube. Fig. 5 illustrates the same cut transversely into prescribed lengths and indicates the necessary scrap therefrom, and Fig. 6 illustrates means for applying the cooling medium to the tube as it is welded.

For the practice of the invention I employ any suitable welding-furnace having a heating-space practically double the length of the ordinary furnace now in use. In actual practice the furnace will be about thirty-eight to forty-one (38 to 41) feet in length and having a hearth 2 of sufficient width to receive six or more strips to be welded into tubing, the furnace being arranged to be heated by gas, the gas and air ports 3 being located at the sides of the hearth. The strips may be fed to the furnace either manually or by any suitable charging apparatus—such, for example, as that shown at 4—which is arranged to be reciprocated transversely of the furnace-chamber across the end thereof and opposite the charging-openings 5 and which has a flat top or table 6 to receive the strips and a pushing-arm 7 for pushing them into the furnace. At the opposite end of the furnace is located any suitable drawing apparatus 8, the one shown being a draw-bench adapted to reciprocate either on parallel lines or to swing from a fixed point at its outer end across the front of the furnace and having a continuously-running draw-chain 9, with which the tongs 10 or other suitable tube-drawing tool is connected in the operation of drawing and welding the tube, the draw-bench being of sufficient length to draw the double-length strip through the welding-bell. The draw-bench 8 carries at its forward end the bell-holder 11, adapted to hold the welding-bell 12.

On account of the great length of the tube to be formed and the friction of the welding-bell on the strip being welded there is liability that such great length of welded tube, if permitted to retain a high welding heat, will stretch before the strip is entirely welded into tubing. For some sizes of tube and thicknesses of metal it is designed to cool the welded portion of the tube sufficiently to prevent such stretching. While it is thus to be cooled, however, it is necessary that it shall not be permitted to fall below a sufficient rolling temperature for the finishing of the tube. Hence the cooling medium must be so applied that while it will fairly stiffen the work it will not overcool it or reduce it below a suitable rolling heat. It is also important that it shall cool the tube to the same extent throughout its length, and for this purpose I place any suitable jet mechanism in position to project a cooling medium against the welded portion of the tube back of the bell-holder 11 but close to the same, so that as soon as any portion of the tube is welded it is carried past such jet mechanism and cooled by the cooling medium projected against it. I prefer to employ regular air-blast pipes, and for this purpose I have shown in the drawings the air-blast pipes 13, supported on the draw-bench and extending up to the level of the course of the tube on each side back of but close to the bell-holder, the blast-pipes having spreading nozzles 14 to distribute the air for some distance along the course of the passing tube and so acting to reduce its temperature and stiffen it sufficiently to prevent its undue stretching during the welding of the remainder of the strip. The air under pressure may be carried to blast-pipes supported on the draw-bench and traveling with it. Instead of the air-blast jets of water or other suitable cooling medium may be applied to the tubes, as found most desirable.

Located at the side of the draw-bench is the trough 16, to which the operator delivers the welded tube 15, such trough corresponding substantially in length to the tube formed and being placed in line with the sizing-rolls 17, which are an ordinary pair of direct-acting concave rolls adapted to receive the welded tube and roll it to even diameter and deliver it to the trough 18, which is in line with and adapted to feed the tubes to the finishing-rolls 25. The tube can either be cut into standard lengths when in the trough 16 or in the trough 18. I prefer to locate the saw for cutting it into lengths in the trough 18 and have shown the same in full lines in connection with that trough and in dotted lines in connection with the trough 16. Such hot saw 19 is arranged to pass across the course of the trough 18, which has a slot 20 for permitting the passing of the saw, the trough being thus divided into two sections 21 and 22, so that the tube as it lies in the trough may be cut into two standard lengths. Each trough-section is provided with power-driven feed-rolls 23 and 24, respectively, under the control of the operator, so that after the cutting of the tube the first section lying in the trough-section 22 may be fed forward to the finishing-rolls 25, and after that section passes through the same the length of tubing in the trough-section 21 may be fed forward through the section 22 into the same finishing-rolls. The finishing-rolls preferred are diagonal cross-rolls adapted to both rotate the pipe and feed it forward, and in so doing to smooth its surface and bring it to proper cylindrical shape. Whether the tube is cut into lengths in the trough 16 or in the trough 18 it will be evident that by so cutting it and feeding the separate lengths to the cross-rolls I avoid severe torsional strain upon or whipping action of the tube during the cross-rolling thereof.

The above-described plant forms the subject of a Patent No. 715,854, granted to me December 16, 1902, upon a separate application originally filed by me on the same day that the original application herein was filed.

For the practice of the invention the tube-blanks, which by way of illustration have been shown as flat strips or plates, are made of multiple length suitable for forming at least two standard lengths of tubing, and for that purpose in forming the standard eighteen (18) foot lengths of pipe the strips 26 are usually made about thirty-eight (38) feet in length. Their forward ends are trimmed and bent so as to provide raised tongued ends 27, adapted to pass over the inclined sand bottom of the furnace, as fully described in my said Patent No. 581,251. For the rapid practice of the invention I generally arrange the furnace-bottom to receive six or more parallel processions of strips. The members of each procession of strips are fed successively into the furnace-chamber through the rear port 5, which may be divided by pillars, if desired, and each strip rests in the position into which it is so fed (being adjusted to place if necessary in case of careless feeding) until it is brought to the proper heat for withdrawal from the furnace. The furnace is maintained at an extremely-high welding heat and is preferably maintained at a practically even heat throughout, though the heat may be varied, if desired, as hereinafter described.

The time for heating each strip in the furnace varies according to the size of the strip from about three-fourths of a minute to a minute and a half, and when a strip is at the proper temperature for welding—that is, when the operator sees that the metal is running on the edges of the forward end of the strip—he grasps such forward end with his tongs, which he introduces through the opening 28 in the front end of the furnace. The welding-bell is then slipped over the tongs and the tongs connected to the draw-chain 9, by which the heated strip is drawn from the furnace into and through the welding-bell, its edges while at a high welding heat being thus forced to curve over toward and abut against and weld fast to each other within the welding-bell. During the welding two causes operate to heat up the welding-bell—to wit, the friction or the transformation of the work done into heat and, what is more important, the direct contact of the bell with the hot metal. Therefore in butt-welding double-length tubing it is desirable to increase the speed of the drawing mechanism in order to lessen the duration of the subjection of the bell to such direct contact, as described in my Patent No. 715,856, granted December 16, 1902, for which I originally filed application under date of May 14, 1901. As soon as the double-length tube 15 is delivered from the welding-bell an operator frees the tongs from the draw-chain and opens the tongs and passes the welded tube to the trough 16, from which said tube is fed to the sizing-rolls 17 and is delivered into the trough 18. The hot saw being then appropriately fed cuts said tube into two lengths 29 and 30, which rest, respectively, in the trough-sections 21 and 22. Before the tube lengths 29 and 30 fall below the proper rolling heat they are successively fed forward to the finishing-rolls 25. As the original double-length tube has been cut into two standard lengths, it is evident that each of such standard lengths requires trimming only at one end. As indicated in Fig. 5, this trimming yields the scrap ends 31 and 32, and thus there is but one scrap end for each tube of standard length produced instead of two such scrap ends, as necessary in the previous manufacture. Furthermore, the central portion of the multiple-length blank which would have been cut and trimmed in making tubes from single-length blanks is heated in the mid-portion of the furnace-chamber within the zone of proper heating and is therefore properly heated for welding instead of being exposed to the chilling action of the air entering the mouths of the furnace, which tends to imperfect welding.

In the practice of the invention, on account of the great length of the tube welded at one time and the strain brought upon the hot welded tube in drawing such a length through the welding-bell caused by the friction within said bell, in the making of certain sizes of tubing there is liability of the tube stretching, and thereby changing its diameter, and this is overcome to some extent by the air-blast or water-jet playing upon the welded portion of the tube after it passes through the welding-bell, as above provided for, which chills the body of the tube sufficiently to prevent the tendency to stretch, though the welded tube is still maintained at a rolling heat. For this purpose it is evident that any suitable cooling medium may be employed, the air-blast being considered the most desirable. For certain sizes of tubing it is also desirable to vary the heat of the plate to some extent in order to overcome such tendency to stretch, and this may be accomplished in any desired way. For example, I may charge the plate at a greater rate of speed than that at which it is withdrawn, so that the forward end of the plate is subjected to the heating action for a slightly-shorter period than the rear end thereof, and as the welder grasps the plate and commences the welding operation as soon as the forward end is in condition for welding and the heat of the plate increases gradually to the other end the part of the tube first welded and which is subjected to drawing strain for the longest period may be maintained cool enough to prevent undue stretching. As the "liquor" flows more freely on the part of the plate more highly heated and acts to some extent as a lubricant, the friction of the part last passing through the bell and the drawing strain on the part of the tube already welded are reduced. Such variation of heat is, however, only necessary in making certain sizes of tubing or where the tube-walls are thin, and the relative speed of the charging apparatus and the withdrawing apparatus can be varied according to the necessities of the case. For the same purpose of heating the forward end of the plate to a lower heat than the rear end of the plate the heat of the furnace itself may be graduated by the admission of steam or in other suitable ways, and for this purpose steam-pipes 33 are provided in the furnace-walls.

In finishing the tubes in the diagonal cross-rolls the tubes are rotated at high speed while being gradually fed forward, and it is evident that with the tube of full length as so welded the rotation would generate severe whipping action of the free end or ends of the tube or, if the tube be held from the same, cause distortion of its body when in the ductile condition incident to rolling heat, and therefore that it would be impracticable to employ cross-rolling for finishing such long lengths of tubing. To avoid such difficulties as above set forth, the tubes are divided into lengths, and each length is cross-rolled separately while still at the rolling heat, in which case it becomes practicable to cross-roll without such severe whipping action.

When delivered from the welding-bell, the forward tongued end grasped by the tongs may be distorted and is liable to chill and stiffen quickly, and the body of the tube may be of irregular size. It is therefore preferable to immediately size the hot welded tube by direct or straightway rolling to form up this tongued end and bring the tube to size and then divide the hot sized tube into lengths and cross-roll, because it is important that the forward end of each tube be of proper shape to enter the cross-rolls and that each tube be of practically uniform section when passing through the cross-rolls.

By my invention I am thus enabled to produce two or more standard lengths of tubing by a single charging, heating, and bell-welding operation, reducing the labor both of the chargers, the welder, and workmen, and increasing the output of the plant at least one-half, while a large saving is effected by the diminution in the quantity of scrap produced and in the fuel required, and adequate means are provided for overcoming the difficulties inherent in the process of welding and finishing a great length of tube at one time.

What I claim as my invention, and desire to secure by Letters Patent, is—

1. The herein-described method of forming multiple tubes at a single heat, consisting in feeding a multiple-length tube-blank into a furnace-chamber, raising its edges to a welding heat, welding it into tubing, and dividing it into tubes of standard length.

2. The herein-described method of welding and finishing multiple tubes at a single heat, consisting in feeding a tube-blank of multiple length into a furnace-chamber, raising its edges to a welding heat, welding it into tubing, and dividing it into lengths, and while still at a rolling heat, cross-rolling each length separately.

3. The herein-described method of butt-welding and finishing multiple tubes at a single heat, consisting in feeding a multiple-length tube-blank into a furnace-chamber, raising its edges to a welding heat, and drawing it through a welding-bell and thereby welding it into tubing, and avoiding severe torsional strain or whipping action during the finishing by dividing it into lengths and while still at a rolling heat cross-rolling each length separately.

4. The herein-described method of butt-welding and finishing multiple tubes at a single heat, consisting in feeding a multiple-length tube-blank into a furnace-chamber, raising its edges to a welding heat and drawing it through a welding-bell and thereby welding it into tubing, immediately sizing the long hot tube by direct or straightaway rolling, and avoiding severe torsional strain or whipping action during the finishing by dividing the sized tube into lengths and while still at a rolling heat cross-rolling each length separately.

5. The herein-described method of forming butt-weld tubing, consisting in introducing a tube-blank into the furnace-chamber, raising its edges to a welding heat, drawing it through a welding-bell and thereby forcing its edges together and welding it into tubing, and applying a cooling medium to the welded portion as it issues from the welding-bell.

6. The herein-described method of forming butt-weld tubing, consisting in introducing into the furnace-chamber a tube-blank sufficiently long to form two or more tubes of a standard length, raising its edges to a welding heat, drawing it through a welding-bell and thereby forcing its edges together and welding it into tubing; applying a cooling medium to the welded portion as it issues from the welding-bell and while the tube is still at a rolling heat, cutting it into prescribed lengths and finishing each length separately.

7. The herein-described method of forming butt-weld tubing, consisting in introducing into the furnace-chamber a tube-blank sufficiently long to form two or more tubes of standard length; raising its edges to a welding heat; drawing it through a welding-bell and thereby forcing its edges together and welding it into tubing; moderately cooling the welded portion as it issues from the welding-bell by forcing an air-blast against it, and while it retains a rolling heat, cutting it into prescribed lengths and finishing each length separately.

8. The herein-described method of forming butt-weld tubing, consisting in introducing a tube-blank into the furnace-chamber, raising its edges to a welding heat, drawing it through a welding-bell and thereby forcing its edges together and welding it into tubing, and as the tube issues from the welding-bell forcing an air-blast against the welded portion.

9. The herein-described method of forming butt-weld tubing, which consists in introducing through the rear end of the furnace into the furnace-chamber, with a prescribed high speed of longitudinal motion, a tube-blank sufficiently long to form two tubes of standard length, raising its edges to a welding heat, and, with a relatively lower speed of motion, drawing it by the end first introduced through the opposite or front end of the furnace and through a welding-bell and thus welding it into tubing, whereby the temperature of the forward end of the blank when being welded by passing through the welding-bell is not so high as the temperature which the rearward portion of the blank has when passing through the welding-bell to be welded.

In testimony whereof I, the said PETER PATTERSON, have hereunto set my hand.

PETER PATTERSON.

Witnesses:
JAMES I. KAY,
ROBERT C. TOTTEN.